G. B. ALLEN.
AUTOMATIC BOX AND COVER ASSEMBLING MACHINE.
APPLICATION FILED NOV. 4, 1912.
1,068,034.
Patented July 22, 1913.
3 SHEETS—SHEET 2.
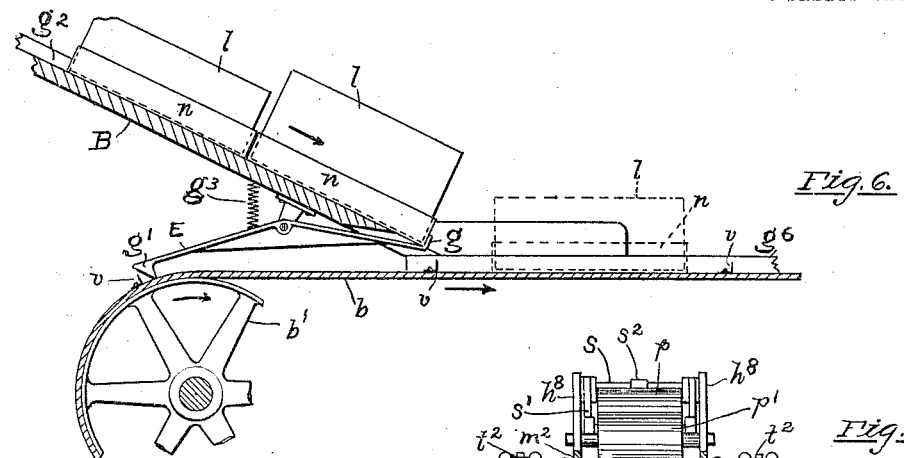
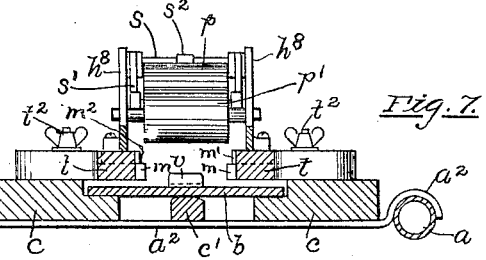
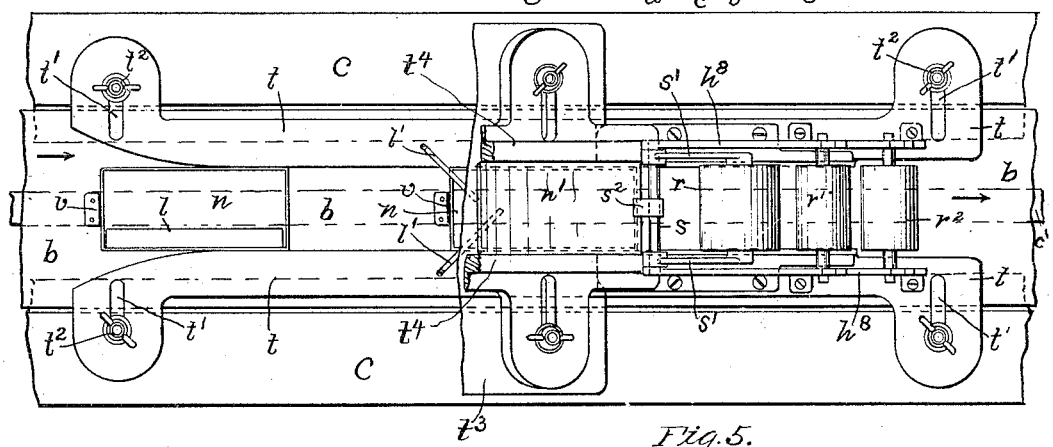
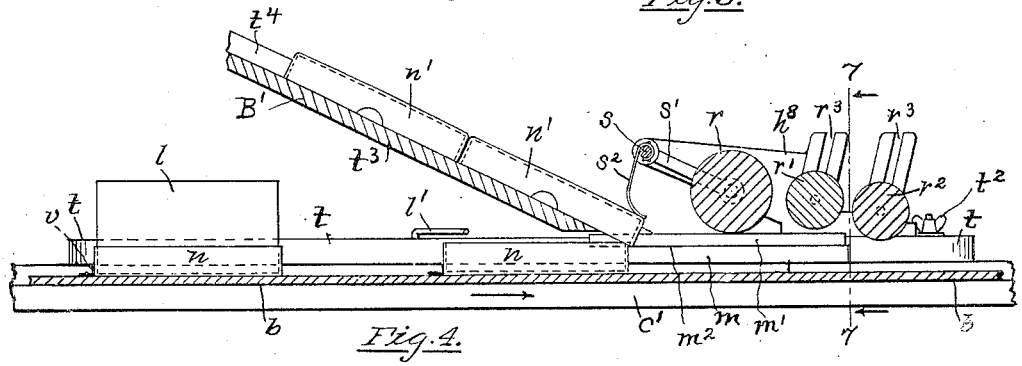
WITNESSES.
Calvin H. Brown
William D. Plympton
INVENTOR.
George Bion Allen.
BY Geo. H. Remington.
ATTY.

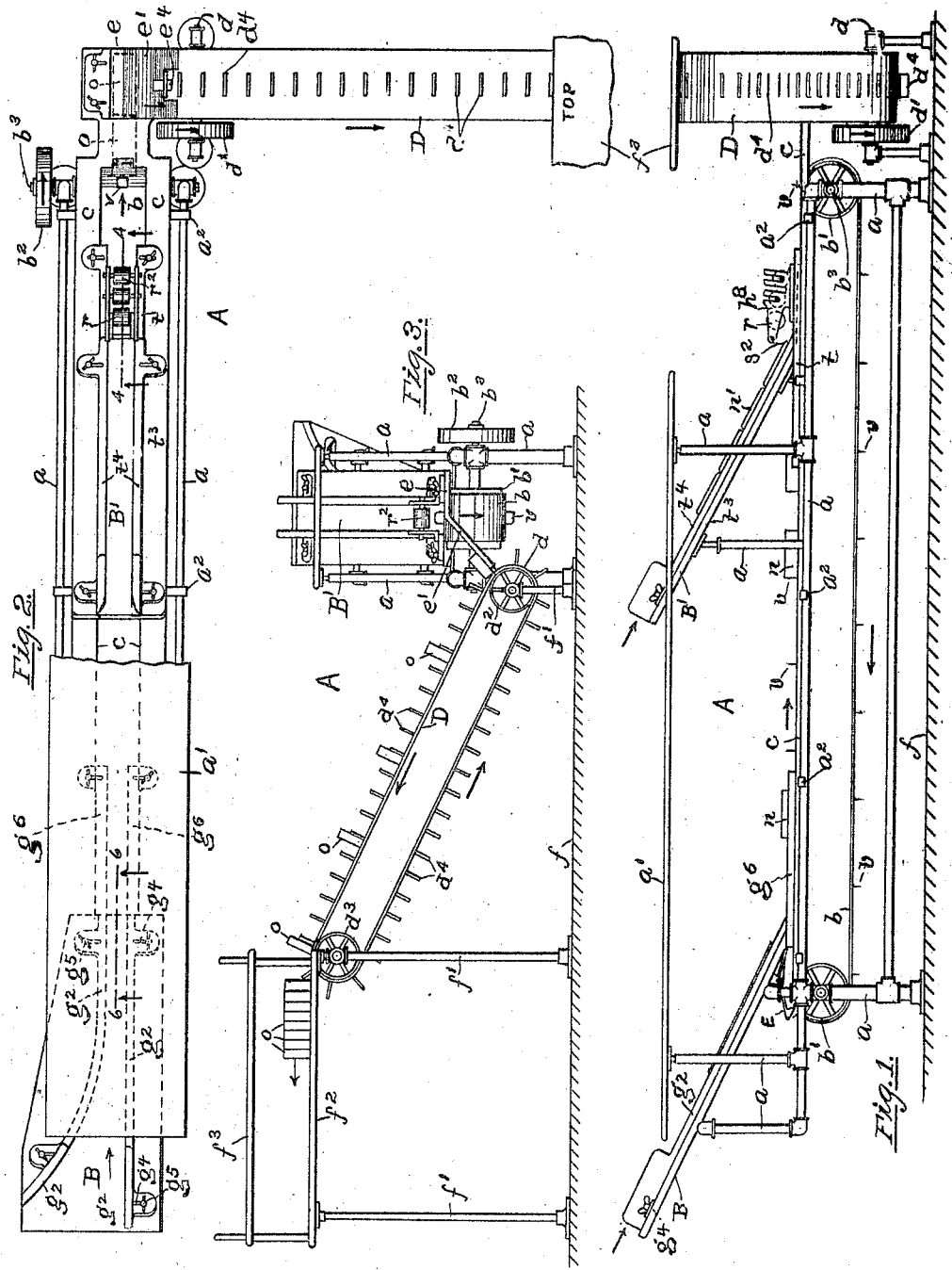

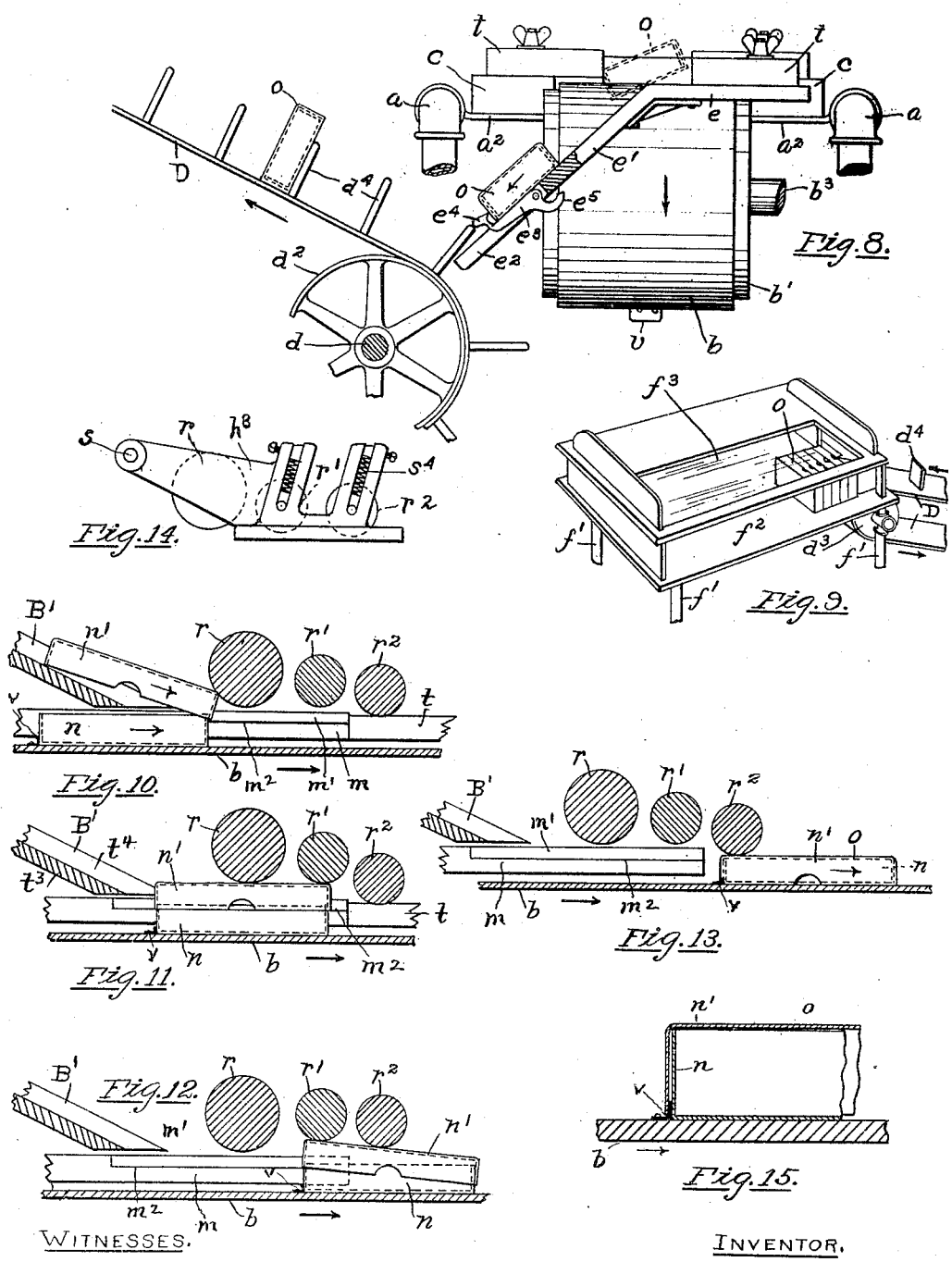

UNITED STATES PATENT OFFICE.

GEORGE BION ALLEN, OF PAWTUCKET, RHODE ISLAND.

AUTOMATIC BOX AND COVER ASSEMBLING MACHINE.

1,068,034. Specification of Letters Patent. Patented July 22, 1913.

Application filed November 4, 1912. Serial No. 729,342.

*To all whom it may concern:*

Be it known that I, GEORGE BION ALLEN, a citizen of the United States, residing at Pawtucket, in the county of Providence and State of Rhode Island, have invented certain new and useful Improvements in Automatic Box and Cover Assembling Machines, of which the following is a specification.

This invention relates to machines for automatically applying covers to boxes, or box and cover assembling machines, as they may be termed, and it consists in certain novel features of construction and combination of parts, all as more fully hereinafter set forth and claimed.

The object of the invention is to provide a box and cover assembling machine adapted to receive singly in a disassembled state from suitable sources of supply the box or container member proper and the cover members of the boxes and deliver them properly assembled. That is to say, the members, comprising the boxes and covers, are automatically assembled or capped during their passage through the machine, thereby producing a column of closed individual boxes which are discharged onto a traveling conveyer, arranged in turn to deliver them in a closely grouped state on a suitable base or table, from which latter an attendant removes and bundles them.

The primary feature of the present invention consists in providing a machine of the character referred to with means for causing the disconnected or separated units constituting the box or container members and the corresponding cover members of boxes to be brought together, whereby each box is discharged from the machine in a normally closed state, the cover then being superimposed and removably seated on the lower or container part, the respective parts of each box then properly registering with each other.

The invention further consists in a box and cover assembling machine, the combination with a continuously traveling endless carrier for successively advancing the spaced individual boxes to engage the covers positioned in the path of the boxes, yieldingly mounted rolls located above and forward of the covers for causing the latter to be gradually and properly seated on the corresponding boxes while they are passing under the rolls.

The invention further consists in a box and cover assembling machine, the combination of an endless carrier for successively advancing the spaced individual box parts to engage the positioned covers, said containers or boxes having flexible foldable fly-leaves secured thereto, and normally stationary deflecting fingers positioned with respect to the moving boxes, whereby the said fingers are adapted to engage the fly-leaves and automatically deflect them downward into the box in advance of placing the cover over it.

The invention further consists in an automatic box and cover assembling machine, having in combination with an endless continuously traveling conveyer provided with uniformly spaced thin clip or lug members secured thereto, said lugs being spaced apart to freely receive a box, and means for intermittently feeding a box unit upon the conveyer, so as to be engaged and propelled by the adjacent rear lug, of a guided box-cover unit temporarily supported at an angle over the conveyer, having its forward lower end lying in the path of the box, arranged whereby the latter, in advancing, is caused to enter the cover and engage its forward end and to forcibly withdraw the cover from its support or runway, the two members of the box then being propelled in unison, and independently revoluble pressure-rolls engageable with the cover for causing it to normally close the box.

The invention also consists in an automatic box and cover assembling machine having in combination with an endless flexible conveyer adapted for continuous forward movement and provided at spaced intervals with lugs outwardly fixed thereto, an inclined runway disposed with relation to the conveyer for containing a supply of box units, means actuated and controlled by said conveyer for releasing the bottom unit from the runway to be engaged by a lug of the conveyer and at the same time arresting the then downwardly moving column of said units in the runway, a second runway supporting a column of cover units, the lowermost cover having its forward end portion extending below the upper edge of the advancing box unit, whereby the box, upon entering the temporarily positioned cover member engages the latter and draws it from its runway, and means coöperating with the connected box and cover members for telescopically closing the box.

The invention also consists in an automatic box and cover assembling machine having an endless traveling conveyer and a pair of independent runways disposed with relation thereto for holding the box and cover units in a disassembled state, the said box units having protective fly-leaves secured therein, the combination therewith of means attached to the said conveyer for withdrawing the box and cover members from the respective runways, means for deflecting the said fly-leaf or fly-leaves and normally positioning the same within the box body while the latter is moving and before it engages the cover part, and means for closing or telescoping the members of the box.

The invention also consists in the combination with an automatic box and cover assembling machine of the character described, having an inclined table at its rear end on to which the cover or fully closed boxes are successively discharged, of an endless box-transferring belt moving in coöperation with the box and cover assembling mechanism and disposed at an angle to said table, the transfer-belt being provided at comparatively short, uniform intervals with members or partitions forming independent spaces adapted to receive the said closed boxes singly from the table and deliver them in a closely grouped state on a collecting platform.

The invention also consists in the combination with an automatic box and cover assembling machine, of means connected therewith for automatically changing the closed boxes' normal position bodily 90° in a vertical plane and delivering them intermittently in a closely grouped column or row.

In the accompanying three sheets of drawings, Figure 1 is a side elevation of an automatic box and cover assembling machine embodying my invention, some of the minor details being omitted. Fig. 2 is a corresponding top plan view. Fig. 3 is an end elevation of the machine viewed from its right or delivery end. Fig. 4 is a partial longitudinal sectional view, on enlarged scale, taken on line 4—4 of Fig. 2. Fig. 5 is a corresponding top plan view of said portion. Fig. 6 is a longitudinal central sectional view, in enlarged scale, taken on line 6—6 of Fig. 2 at the front end of the machine. Fig. 7 is a transverse sectional view, taken on line 7—7 of Fig. 4. Fig. 8 represents, enlarged, portions of the rear end of the machine, showing parts of the delivery chute and inclined conveyer mechanisms for automatically handling the normally closed boxes. Fig. 9 is a perspective view of the upper portion of the last-named conveyer and stationary table or bench onto which the covered boxes are finally discharged. Figs. 10 to 13, inclusive, are longitudinal sectional views showing various positions of the box and cover units of the box while being subjected to the action of the yieldingly mounted cover-pressing rolls for automatically closing the boxes. Fig. 14 is a side view, in reduced scale, showing a modification of the said rolls; and Fig. 15 represents, on enlarged scale, a partial section showing the relation of the closed box $o$ to the lug $v$ and belt $b$ before the box is delivered from the conveyer.

I would state that while my improved automatic box and cover assembling machine is or may be adapted for use in connection with separable telescoping boxes or containers having various forms and constructed from metallic or non-metallic material, and supplied to the machine in a charged or empty state, as desired, the drawings represent it in connection with comparatively shallow rectangular-shaped empty boxes, in which the box or body and cover units thereof are made of suitable fiber board, and in which the depth of the cover member is substantially the same as that of the box, which latter is enveloped by the cover. The box, prior to entering the runway, may be provided at the top edge along one or both its longitudinal sides with one or more fixed fly-leaves adapted to be inturned or infolded flatwise into the interior of the respective boxes before the cover members are actuated to normally close the box.

The following is a more detailed description of the machine forming the subject of this application for patent, and also including the manner of its operation:

The machine as a whole is indicated by A, its members being represented in the normal operative relation and position.

It may be stated in advance that in the accompanying drawings and specification the left or feed end is termed the front end, and the right or delivery end the rear end of the machine.

The supporting frame part proper, $a$, is shown as constructed of piping or tubing and suitable fittings, and having supporting legs resting on the base or floor $f$. At each end of the machine (see Fig. 1) is mounted a revoluble supporting wheel $b^1$ which carries an endless flexible conveyer-belt $b$, provided longitudinally at suitably spaced apart intervals with fixed thin sheet metal lugs or clips $v$. Continuous traveling movement is imparted to the conveyer by means of a belt-driven pulley $b^2$ secured to shaft $b^3$ located at the rear or delivery end of the main part of the machine. To said shaft is secured the corresponding conveyer-supporting wheel $b^1$.

The upper portion of the conveyer $b$ is slidably supported flatwise along its longitudinal edges on the recessed inner longitudinal parallel edge portions of the elongated, laterally separated stationary top table members $c, c$, fixed to transverse under brackets $a^2$, the ends of the latter being bent and borne by the top side members $a$ of the frame. See Figs. 2 and 7. The center portion of the belt $b$ is or may be supported by the longitudinally extending stationary bar $c^1$.

To the front or box and cover feeding end of the machine is located an inclined runway or chute B for the box units $n$, the chute's lower end terminating near the upper surface of the conveyer $b$. The said terminal part is provided with a tilting lever or stop E—see Figs. 1 and 6; its inner end having an upturned lip $g$ normally supporting the column of said box units $n$. In normal action the column of units are held in check by the said lip; the opposite or front end $g^1$ of the lever is cam-shaped and positioned in the path of the spaced lugs or clips $v$ of the continuously traveling conveyer-belt, the arrangement being such that upon the engagement of each lug $v$ with the cam $g^1$, the lever is thereby positively tilted, thus depressing the lip $g$, thereby permitting the pressure of the inclined column of box members to automatically force the lowermost one flatwise on the belt between a pair of the then adjacent lugs. Immediately succeeding the latter action, the lever automatically returns in time to place its lip $g$ in position to temporarily arrest the next succeeding bottom box, thereby holding the column in check and preventing further movement until the next release takes place. At the same time, too, the opposite or front end of the lever becomes positioned again in advance of the next succeeding lug $v$ of the moving belt $b$. A push-spring $g^3$ may be used in coöperation with the lugs to insure the lever's movements. The lateral sides $g^2$ of the chute are oppositely disposed: the distance between them forming a trough adapted to freely receive the units $n$. In order to adapt the chute to receive units varying in size, or even when the latter are introduced sidewise instead of endwise, the said side walls are adjustable laterally by means of bolts passing through slotted openings $g^4$, in coöperation with securing nuts $g^5$. To the stationary table $c$ are adjustably secured laterally separated sides $g^6$, these latter constituting a continuation of the guide chute.

At or near the rear or delivery end of the machine is positioned an inclined runway or chute $B^1$ for supporting and guiding the column of cover units $n^1$, the latter adapted to receive the units $n$. The drawings represent the chutes positioned or spaced apart corresponding to a multiple of units $n$. The rear runway $B^1$ is constructed substantially like the other front one, except that the unit-releasing device of the former is omitted. The chute $B^1$ is represented more clearly in Figs. 4 and 5. To the upper side of the base $t^3$ of the chute is secured the sides $t^4$, arranged to form a trough for guiding the cover units $n^1$ so as to properly position them to register with and be successively engaged by the units $n$ being propelled by the continuously traveling conveyer $b$ therebelow. The sides of the chute $B^1$ are capable of adjustment laterally, thereby adapting the trough to receive units varying in size, substantially as stated with respect to the runway B.

To the top of the stationary main table $c$ of the machine and contiguous to the lower end portion of the chute $B^1$ are mounted laterally separated, longitudinally extending flat guide plates $t, t$, capable of adjustment in a lateral direction by means of bolts $t^2$ passing through slotted openings $t^1$ in the plates; cap nuts fitting the bolts serve to secure the plates in position. Oppositely located horizontal narrow gage strips $m$ of suitable material (Figs. 4 and 7) are secured to the vertical inner faces of the plates $t$; the lateral distance between these strips slightly exceeds the corresponding outer distance between the sides of the units $n$; the upper edges of the parts $m$ lie parallel with the corresponding edge or top of the said unit, but somewhat below the latter, say about one-half the unit's depth, thereby, in connection with the parallel gage strips $m^1$ secured to said plates $t$ above the strips $m$, forming a narrow ledge or shoulder $m^2$ on each side to receive and support the lowermost cover unit until it is withdrawn bodily from the runway by the action of the advancing body unit $n$. The lateral distance between the strips $m^1$ is substantially the same as the width of the covers. It is to be understood that, as represented, the depth of the side walls of both members of the box are substantially alike, and so that when the members are normally closed or assembled, the body part $n$ is fully inclosed by or in the cover part $n^1$. See Figs. 13 and 15.

The manner of assembling the box members is as follows: the completed covers $n^1$ are fed into the rear runway $B^1$ at its upper end, the closed faces being uppermost; the column of units slide by gravity until the lowermost one is arrested by the two lateral shoulders $m^2$, in connection with a suitable friction brake, as for example, a light retarding spring $s^2$ (Fig. 4), thus temporarily holding the column of units in check and causing the lower edge of the forward unit's end to lie in the path of and below the upper edge of the advancing unit $n$, the latter freely entering the cover chamber. Immediately the said end members engage each other, that of the unit $n$ operates to forcibly withdraw the cover and carry it therewith, the cover meanwhile sliding at an angle along the shoulders $m^2$, and at the same time being gradually pressed down over the walls of the unit $n$ by the independently mounted gravity or weight rolls $r$, $r^1$, $r^2$. See also Figs. 10, 11, 12. After the lower edges of the cover pass from the shoulder $m^2$ the rearmost roll $r^2$ serves to press the cover downward to its limit, corresponding to the normally closed or assembled condition; the thus covered box being designated $o$. See Figs. 13 and 15. The said rolls $r$, $r^1$, $r^2$ are freely revoluble in oppositely disposed side frames $h^3$ secured to the plates $t$. I prefer to use gravity acting rolls; if desired, however, springs $s^4$ may be employed for varying the pressure of the rolls. See Fig. 14. The forward roll $r$ is revoluble in side arms $s^1$ secured to a shaft $s$ movably supported in extensions of the frames $h^3$. The said brake-spring $s^2$ may be fixed to the shaft $s$.

The rear or discharge end portion of the table $c$ is cut away (Fig. 2) to allow the traveling conveyer belt $b$ and its lugs $v$ to pass downward therethrough at a point adjacent the revolving combined driving and carrier wheel $b^1$. It is at this point that the closed boxes $o$ are intermittingly delivered singly onto an extension $e$ of the table $c$. The said table part $e$ has a downwardly inclined extension $e^1$ disposed transversely of the machine, its lower portion having a slotted opening $e^2$ in which a movable stop lever $e^3$ is pivotally mounted. The outer end $e^4$ of the lever is maintained in the normal depressed position below the face of table $e^1$ by gravity, while at the same time the lever's upper end $e^5$ is in engagement with the underside of the table.

A relatively short, upwardly inclined flexible endless transfer belt D is mounted on carrier wheels $d^2$, $d^3$; the first-named wheel, $d^2$, being fixed to a suitably supported shaft $d$ actuated by a driving-pulley $d^1$. The belt D is provided longitudinally with comparatively closely spaced partition-like lugs $d^4$ disposed transversely thereof at substantially right angles or perpendicularly to the belt's face. The lower end of the inclined table $e^1$ extends to or nearly to the face of the upwardly moving belt, the said slotted opening $e^2$ freely permitting the passage therethrough of the lugs $d^4$—see Fig. 8. The upper end portion of the belt is supported on the revoluble wheel $d^3$, in turn supported in bearings fixed to upright columns $f^1$. A stationary platform $f^2$ is also supported by the columns, its upper face being positioned so as to receive thereon the boxes $o$ as they are delivered intermittently and successively from the transfer-belt.

As thus constructed the boxes are discharged singly from the conveyer $b$ onto the downwardly inclined table $e^1$ and from the latter onto the continuously moving belt D between a pair of its partitions $d^4$. Each of the latter in passing through the opening $e^2$ engages the gravity dropped lever $e^3$ and swings its end $e^4$ upward in position to serve as a stop to temporarily arrest and hold the box or boxes on the table $e^1$ in check until the active holding lug $d^4$ has passed, at which instant the lever $e^3$ drops back below the table's face, thereby releasing the lowermost box to slide by gravity onto the belt before the next succeeding lug or partition actuates the lever again to position its end $e^4$ in advance of the next succeeding box of the column. While this intermittent action is taking place the assembled boxes $o$ are being discharged endwise in a flatwise condition from the main conveyer onto the table members $e$, $e^1$, which, in coöperation with the moving belt D automatically changes the direction of the movement of the boxes from longitudinal to lateral and at the same time tilts the boxes and causes them to engage the belt D edgewise, corresponding to an angular change of 90° from their former position. It is obvious that the normal speed ratios of the two belts $b$, D, are such as to prevent a surcharged column of the covered boxes from accumulating on the table $e$, $e^1$.

In order that the cover part $n^1$ may readily receive the box part $n$ and be pressed down by the rolls to its normally closed condition without injury to the parts, the knee-like lugs or box-propelling members $v$ are preferably made of thin sheet metal and mounted substantially as shown in Figs. 13 and 15, wherein the vertical arm of the lug lies between the adjacent ends of the parts $n$ and $n^1$, the arrangement allows the closed boxes to be readily discharged from the conveyer and the respective lugs onto the table $e$, $e^1$, when the belt commences to flex itself around the revolving rear carrier's wheel $b^1$.

The cover and box units of the boxes may be deposited in separate piles on an elevated flat stationary table $a^1$ disposed above the runways or chutes B, $B^1$, and supplied respectively to the latter from the table by an attendant.

By means of the normally positioned deflectors $l^1$ (Figs. 4 and 5) located in the path of and slightly above the upper edge of the moving open units $n$, any fly-leaves $l$ of the latter not already properly infolded, will, upon their engagement with the members $l^1$, be deflected downwardly and inwardly and caused to lie substantially flatwise in the unit's chamber. One or both of the side walls of the boxes may be provided with lining leaves, as desired. It is evident, too, that the units $n$ may be introduced into the runway B in an indiscriminate manner, i. e., either end-foremost; the base or bottom side of the boxes, however, rest directly upon the bottom of the chute and conveyer during the cover-attaching operation. Now, assuming the runways B, B¹, to be continuously supplied or charged with the suitably arranged box and cover units $n$, $n^1$, respectively, and that the upper portion of the traveling conveyer $b$, between the lower ends of the runways, is already provided with a number of body units $n$, as determined by the lugs $v$, the forward movement of the belt causes the temporarily front lug to engage and trip the stop E, thereby releasing the lowermost box, which slides direct onto the belt, the stop immediately thereafter automatically returning to its normal position to hold the column of boxes in check until again acted upon by the succeeding lug $v$. The fly-leaves $l$ of the units $n$, when the latter are released from the runway B, may stand in various positions. Meanwhile the units on the moving conveyer successively pass the deflectors $l^1$; these latter at the same time engage the fly-leaves and uniformly position them flatwise within the box before its engagement with the cover unit $n^1$. While the foregoing movements are taking place the lower cover unit in the runway B¹ is temporarily supported at an angle by the unit's side walls which rest on the oppositely arranged horizontal inner shoulders $m^2$, assisted by the light brake device $s^2$, Figs. 4 and 10. The advancing box $n$ enters the positioned cover and forcibly withdraws it from the runway to be acted upon by the positioned rolls $r$, $r^1$, $r^2$, see Figs. 11 and 12; the last-named roll, $r^2$, causing the cover to be pressed downward flatwise over the box immediately the cover slides from the supporting shoulders $m^2$, the two parts then appearing normally connected or assembled telescopically, as indicated by $o$. See Figs. 13 and 15. The thus assembled boxes are discharged singly upon the rear table $e$, $e^1$, in turn disposed at an angle transversely of the conveyer $b$. The boxes $o$ are delivered from the inclined part $e^1$ of the table onto a continuously movable, upwardly inclined transfer-belt D, arranged to receive and support the boxes in a segregated state. Such intermittent action may be effected by a device (Fig. 8 hereinbefore described) actuated and controlled by the belt itself. At the same time, too, the arrangement may be such as to automatically change the position of the boxes 90°, as for example, from a flatwise to an edgewise or sidewise position, thereby delivering the boxes from the belt D in a more closely grouped condition.

The upper end portion of the transfer-belt D is disposed with respect to a stationary platform or table $f^2$, Fig. 3, onto which table the covered boxes are delivered direct from the belt, each box thus delivered forcing the preceding boxes, by means, say of its partitions or members $d^4$, to form a column of closely grouped boxes. Disposed above the column of supported boxes is positioned a suitably mounted transparent top plate $f^3$, by means of which the attendant is enabled to readily see and determine when the column of boxes is of the desired length for removal and bundling.

It may be added that while the function and action of devices embodied in my improved box and cover assembling machine have been described to some extent independently for the sake of clearness, it is obvious that some of them act concurrently, in others the actions take place in a suitably timed successive order of sequence, while the conveyer members proper, $b$ and D, are actuated in a continuous manner. I would also add that obviously the box and cover members may be supplied to the respective runways in a sidewise state instead of endwise, if desired, by simply varying the distance between the lateral sides of the chutes and adjusting other parts of the machine correspondingly.

What I claim and desire to secure by United States Letters Patent is:—

1. In an automatic box and cover assembling machine, the combination with an endless flexible conveyer-belt having longitudinally spaced lugs secured on its upper side or run, and means for continuously moving the belt in a longitudinal direction, of a front chute arranged above the conveyer for holding box body units, means coöperable with said chute adapted, when in normal use, for successively releasing the lowermost box body units singly from the chute onto the conveyer between a pair of its said lugs, respectively, a second chute for holding cover units, the lowermost cover unit automatically positioning itself in the path of the said conveyer carrying the box body units, whereby the said positioned cover unit is adapted to be drawn bodily from the chute by the box body unit, means for successively pressing the cover members onto the respective box body members and closing the boxes while the latter are being propelled by the conveyer-belt, and means for successively discharging the thus assembled boxes from the conveyer.

2. In a machine of the general character described, the combination with an endless conveyer having suitably spaced lugs secured thereto, and means for continuously actuating the conveyer, of a chute disposed at an angle above the conveyer for holding a column of box units, means actuated and controlled by the moving conveyer for intermittingly releasing units from said chute onto the conveyer, a second chute positioned at an angle above the conveyer and in advance of the first-named chute for holding a column of cover units, means for supporting the lower cover member in the chute in a temporarily stationary position in the path of the next succeeding box unit, whereby, when in use, the latter in advancing engages said lower cover unit and draws it bodily from its runway, and one or more guided gravity acting rolls mounted above the cover for causing the latter to be pressed downward to normally cover or close the box while the thus assembled members are passing under the rolls.

3. In a machine of the general character described, the combination with an endless conveyer belt having suitably spaced lugs secured thereto, and means for continuously actuating the conveyer element, of a front chute arranged to hold box units, and means actuated by the conveyer to release the lower box unit from said chute direct onto the conveyer to be engaged by one of its lugs.

4. In a machine of the general character described, the combination with an endless conveyer provided with light, spaced apart lugs, means for driving the conveyer in a continuous manner, a chute located above the conveyer for holding a column of open box units, said units having fly-leaves secured thereto, and a second chute, also located above the conveyer in advance of the first-named chute for holding a column of cover units, of means for intermittingly releasing the said fly-leaf carrying box units from the chute singly onto the conveyer, means positioned intermediate the chutes for automatically deflecting the fly-leaves downward into the cavities of the respective box units prior to the latter's engagement with the covers and means for automatically adjusting the cover units to the box units.

5. In a machine of the general character described, the combination with a suitably mounted longitudinally extending endless conveyer-belt having spaced lugs, means for driving the belt in a continuous manner, and means for intermittingly feeding box units singly onto the conveyer so as to be propelled in unison therewith, of a stationary runway for holding cover units and automatically positioning and supporting them singly in the path of the box unit, whereby, when in use, the box unit is caused to enter and engage the forward end of the said supported cover and draw the latter from its support, a yielding brake or tension device for initial engagement with the cover while it is being thus moved, and independently mounted rolls for pressing the cover downward to its normal limit over the box unit before the thus assembled box and cover members are discharged from the machine.

6. In a machine of the general character described, the combination with an endless conveyer arranged to be driven in a continuous manner, and means for intermittingly feeding box units singly onto the conveyer so as to be propelled in unison therewith, of an inclined stationary chute for holding a column of box cover units, the lower end of the chute being open and arranged for the passage of box units thereunder, a pair of oppositely disposed, longitudinally extending stationary guide members constituting supporting shoulders lying about midway of the height of the box, said shoulders adapted to temporarily support the lower end portion of the cover unit while the other or upper portion rests in the chute, means to cause the upper edge part of the box unit to enter the cover chamber and draw the cover from its chute, means for pressing the cover down evenly over the box until arrested by said supporting shoulders to cause a partial closing, and means for completing the normal closing of the box after it is advanced beyond the supporting shoulders.

7. In an automatic box and cover assembling machine of the general character described, provided with a mounted endless main conveyer arranged for continuous endwise movement, a chute arranged with respect to said conveyer for holding box units, and a similarly arranged chute for holding cover units, the combination therewith of means for intermittingly discharging a box unit from its said chute directly onto the conveyer to be propelled by and in unison with it, means for supporting a cover unit at the lower end of its chute and in the path of the advancing box unit, the latter upon engaging the cover causing it to be drawn bodily from its chute, means engageable with the cover for pressing it downward to its limit to normally close the conveyer-propelled box, an inclined stationary table having a movable stop at its lower or free end for temporarily arresting the closed boxes discharged from the conveyer, a movable secondary endless conveyer disposed at an angle to said table and timed to coöperate with the main conveyer, and spaced partitions or lugs fixed to the secondary conveyer, adapted when in use to engage said stop and successively release the closed boxes, whereby the latter fall by gravity from the inclined table singly onto the face of the last-named conveyer, the partition members thereof at the same time causing the boxes to automatically change the plane of support from a flatwise position to a vertical one before they are finally discharged from the machine.

8. In an automatic box and cover assembling machine of the general character described, provided with a mounted main endless conveyer arranged for continuous endwise movement, a chute arranged with respect to said conveyer for holding box units, and a similarly arranged second chute for holding cover units, the combination therewith of means for intermittingly discharging the lowermost box units singly from the first-named chute directly onto the moving conveyer, means, substantially as described, for successively supporting the lowermost cover units in a temporarily stationary position at the lower end of the said second chute in the path of the advancing box units, whereby the latter is caused to engage the respective covers and draw them from the cover-holding chute, means for yieldingly pressing the cover and box units together to normally assemble them, as in closing the boxes, and means consisting of an upwardly inclined traveling endless conveyer-belt provided with spaced lugs or arms arranged to be engaged by the closed boxes delivered singly from the said main conveyer, for automatically changing the position of the boxes 90° in a vertical plane relatively to the main conveyer before the boxes are finally discharged from the machine.

9. In an automatic box and cover assembling machine having an endless main conveyer-belt mounted for continuous movement and arranged to positively convey spaced box units temporarily positioned thereon, the combination therewith of means adapted to temporarily support the lowermost one of a column of cover units in a relatively stationary position in the path of the box unit, whereby when in use, the moving conveyer-belt causes the box unit to engage the said positioned lowermost cover unit and carry the latter along with it, and a plurality of independently mounted revoluble weight rolls arranged to engage the upper face of the cover and gradually force it downward over the box, thereby normally closing the box.

In testimony whereof I have affixed my signature in presence of two witnesses.

GEORGE BION ALLEN.

Witnesses:
  GEO. H. REMINGTON,
  CALVIN H. BROWN.